United States Patent Office 3,028,501
Patented Apr. 3, 1962

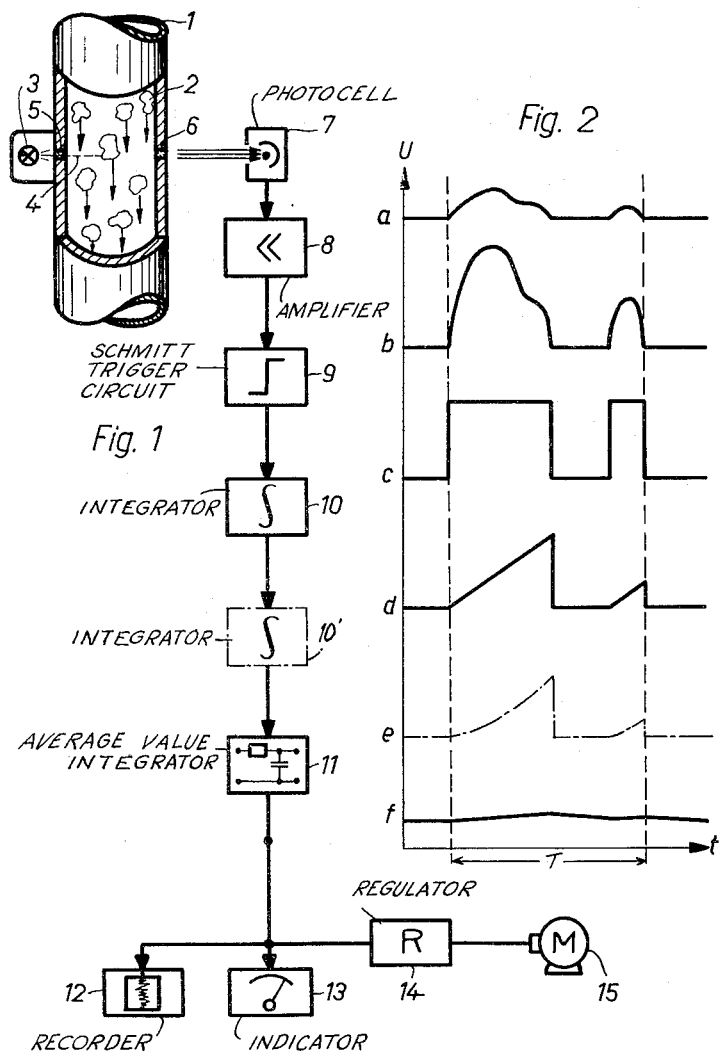

3,028,501
METHOD FOR MEASURING THE VOLUME OR THE WEIGHT OF BODIES HAVING DIFFERENT SIZE AND IRREGULARLY PASSING THROUGH A CHANNEL OR OF ACCUMULATIONS OF SUCH BODIES, PARTICULARLY OF FIBRE TUFTS
Hansruedi Lamparter, Winterthur, Switzerland, assignor to Actiengesellschaft Joh. Jacob Rieter & Cie., Winterthur, Switzerland, a corporation of Switzerland
Filed May 25, 1960, Ser. No. 31,585
Claims priority, application Switzerland June 1, 1959
2 Claims. (Cl. 250—218)

The present invention relates to a method for measuring the volume or the weight of bodies or of accumulations of bodies, particularly of fibre tufts usually moving at different times but at the same speed through a cross section of a channel.

Conventional methods for measuring the amount of bulk goods are either based on rate of flow measurements by means of measuring nozzles or by means of measuring condensers between whose plates the goods to be measured are conducted. The goods form the dielectric between the plates and a measurement of its resistance is an indication of the amount of goods present at the time the measurement is taken. For measuring the flow rate of bodies passing through a certain flow area, electromagnetic waves may be radiated across the flow area whereby the absorption of the waves by the bodies may be used as an indication of the flow rate. The conventional methods are not very accurate if there are periods of time when no body passes through the measuring area. These methods are therefore insufficient for measuring low concentrations of solid matter in a carrier medium, for example of tufts fed to a spinning machine whereby the concentration of pneumatically conveyed tufts in a carrier medium may be as low as one part by volume of tufts in 100 parts by volume of the carrier medium.

The method according to the invention is based on the fact that at statistical distribution of irregular bodies flowing at random through a channel, the volume of the material flowing through the channel during a certain time T is proportional to the sum of the squares of the times at which a light beam extending through the channel in a direction normal to the flow direction of the material is interrupted by the material. The volume of the material is an indication of the weight of the material passing through the channel.

The method according to the invention includes the following steps:

(a) Production of discrete electric signals of equal amplitude and of a duration which is equal to the durations of the light beam interruptions caused by the moving bodies;

(b) Transformation of the discrete electric signals to an equal number of new signals whose time integrals are proportional to the squares of the periods of light beam interruptions by the passing bodies;

(c) Transformation of the new electric signals to a continuous signal by continuous formation of average values at a time constant which depends on the inertia of a system to be actuated or controlled according to the obtained measurements.

This system may be an indicating or a registering device, or include both, and/or a regulator for controlling the rate of flow of the bodies in the channel.

The aforedescribed method provides an indication of the sum of the volumes of the solid bodies passing through the measuring area within a predetermined time, which, if multiplied by the specific weight of the bodies, is a measure for the weight of the bodies passing through the measuring area during the predetermined time. If the bodies consist, for example, of cotton fibre tufts whose specific weight depends on the degree of opening of the material, whereby the specific weight is substantially proportional to the size of the tuft, the weight of the tufts passing through the measuring area is approximately proportional to the sum of the third powers of the interruption periods of the light beam by the tufts.

In a modified embodiment of the invention, the signals produced by step (b) of the aforedescribed method are transformed to signals whose time integrals are proportional to the third power of the duration of the period during which the light beam is interrupted.

The novel features which are considered characteristic of the invention are set forth with particularity in the appended claims. The invention itself, however, and additional objects and advantages thereof will best be understood from the following description of embodiments thereof when read in connection with the accompanying drawing, in which:

FIG. 1 is a diagrammatic illustration of a measuring system according to the invention.

FIG. 2 is a diagram showing, as a function of time, the electric tension in the individual components of the system shown in FIG. 1.

Referring more particularly to the drawing, numeral 1 designates a conduit through which bodies 2 of different configuration and size move, for example due to gravity or due to an air flow produced in a conventional manner, and pass a light beam 4 produced by a source of light 3 and entering the conduit 1 through a small opening 5 which may be closed by transparent material, the light beam leaving the conduit through an aperture 6 which may also be closed by transparent material. The direction of the light beam 4 as it passes through the conduit 1 is normal to the longitudinal axis of the conduit and to the direction of movement of the bodies 2. A photoelectric cell 7, such as a conventional photo transistor placed outside of the conduit 1 and so that it receives the light beam leaving the conduit 1 through the aperture 6, produces, in the conventional manner, an output voltage the valve of which differs in accordance with interruption or absorption of the light beam by the bodies 2. These output voltage differences are plotted at $a$ in the diagram FIG. 2 as a function of time. These voltage differences are amplified without distortion by means of a conventional amplifier 8 to produce a voltage wave form as shown at $b$ in FIG. 2. The amplified voltage wave form is shaped in circuit 9 into voltage signals of square wave form and of constant amplitude as shown at $c$ in FIG. 2. Circuit 9 may be a conventional amplitude-discriminatory circuit such as a Schmitt-trigger circuit, as for instance shown in U.S. Patent No. 2,847,162. The duration of these signals corresponds exactly to the duration of the voltage irregularities shown in the diagramms $a$ and $b$ and thus are proportional to the dimensions of the bodies 2. The signals produced in circuit 9 are applied to the input of a conventional integrating circuit 10 such as shown, for example, in the book "Wave Forms," volume 19 MIT Series, McGraw-Hill 1959, which produces electric values which increase linearly during the duration of the signals as shown at $d$ in FIG. 2. The line showing the linear increase in FIG. 2 forms, with the abscissa from which the line rises, a triangle the area of which is proportional to the square of the duration of the signal.

The signals produced by integrating circuit 10 may be applied directly to the input of an average value integrating circuit 11 well known in the art and described, for instance, in the above mentioned book "Wave Forms," pages 648 to 666. Signals derived from the output of circuit 10 may in another embodiment of the invention first be applied to the input of a further integrator 10' similar to circuit 10. This is explained in more detail below. Circuit 11 produces electric signals plotted at f in FIG. 2 and forming a time integral over a period of time T which must be adapted to the individual conditions of the measuring operation. This time integral is proportional to the volume or weight of material passing through the conduit 1 during the time T. In the illustrated embodiment of the invention, the signals produced by the average value integrating circuit 11 are used for controlling a recording instrument 12, an indicating instrument 13 and a regulator 14 for regulating the speed of a motor 15 which controls, by means not shown, the amount of the material passing through the conduit 1.

If the aforedescribed measuring system is used for measuring the rate of flow of pneumatically conveyed cotton tufts, it must be considered that the volume of the tufts is not an accurate indication of the weight thereof. The degree of opening of the fibre tufts essentially influences the weight thereof, because the interior part of a large tuft is much denser than that of a small tuft. It has been found that the specific weight of a tuft is approximately proportional to its size. The accuracy of this depends on the quality of the cotton. When measuring the flow rate of cotton through conduits in a spinning mill, the deviations due to the aforesaid inaccuracy is usually not objectionable.

To adapt the system according to the invention to measuring fibre tufts passing through a measuring area, a second integrating circuit 10' which is shown in the block diagram FIG. 1 by dash-dot lines, is connected between the output of integrator 10 and the input of average value integrator 11, the additional integrating circuit 10' producing signals corresponding to the third power of the interruption periods. The signals produced in the circuit 10' are plotted at e in FIG. 2 and are applied to the input of circuit 11 and then used in the same manner for indicating, recording and regulating as the signals produced in the integrating circuit 10.

I claim:
1. A method of measuring the volume of bodies moving through a conduit, including directing a light beam through the conduit normal to the direction of movement of the bodies, the latter interrupting the light beam when passing therethrough, producing discrete electric signals of equal amplitude and a duration corresponding to the duration of the light beam interruptions produced by the bodies, electrically transforming the discrete electric signals to electric signals which increase linearly during the same time as the duration of said discrete signals, integrating as to time the last mentioned signals, and averaging the integrated signals to form a time integral which is proportional to the volumes of the bodies passing through and thereby interrupting the light beam.

2. The method defined in claim 1 including the step of transforming the electric signals which increase linearly, into signals whose time integrals are proportional to the third power of the periods of time during which the light beam is interrupted by the bodies.

References Cited in the file of this patent
UNITED STATES PATENTS

| | | |
|---|---|---|
| 1,851,215 | Schunemann | Mar. 29, 1932 |
| 2,363,473 | Ryder | Nov. 21, 1944 |
| 2,494,441 | Hillier | Jan. 10, 1950 |
| 2,791,695 | Bareford et al. | May 7, 1957 |
| 2,791,697 | Dell | May 7, 1957 |
| 2,847,162 | Meyer | Aug. 12, 1958 |
| 2,925,007 | Silver | Feb. 16, 1960 |